April 16, 1963 F. W. KELLEY, JR., ET AL 3,086,129

SATURABLE REACTOR PULSE GENERATOR TRIGGERED BY SWITCH WITH ADJUSTABLE BIAS FOR PLURAL DE-PHASED A.-C. INPUTS

Filed June 29, 1961 3 Sheets-Sheet 1

INVENTORS:
FRED W. KELLEY, JR.,
GEORGES R. E. LEZAN,
CHARLES E. RETTIG,

BY Irving H. Marshman
ATTORNEY.

April 16, 1963 F. W. KELLEY, JR., ET AL 3,086,129

SATURABLE REACTOR PULSE GENERATOR TRIGGERED BY SWITCH WITH ADJUSTABLE BIAS FOR PLURAL DE-PHASED A.-C. INPUTS

Filed June 29, 1961 3 Sheets-Sheet 2

INVENTORS:
FRED W. KELLEY, JR.,
GEORGES R.E. LEZAN,
CHARLES E. RETTIG,
BY Irving H. Marshman
ATTORNEY.

INVENTORS:
FRED W. KELLEY, JR.,
GEORGES R.E. LEZAN,
CHARLES E. RETTIG,
BY Irving H. Marshman
ATTORNEY.

United States Patent Office 3,086,129
Patented Apr. 16, 1963

3,086,129

SATURABLE REACTOR PULSE GENERATOR TRIGGERED BY SWITCH WITH ADJUSTABLE BIAS FOR PLURAL DE-PHASED A.-C. INPUTS

Fred W. Kelley, Jr., Media, Pa., Georges R. E. Lezan, Haddonfield, N.J., and Charles E. Rettig, Havertown, Pa., assignors to General Electric Company, a corporation of New York Filed June 29, 1961, Ser. No. 120,590
7 Claims. (Cl. 307—88.5)

This invention relates to means for generating electrical pulses, more particularly means for generating current pulses to be supplied to pulse utilizing or pulse controlled apparatus such for example as solid state silicon controlled rectifiers and the like and it has for an object the provision of a simple, reliable, improved and efficient pulse generating means of this character.

Still more particularly, the invention relates to pulse generating circuits in which the pulses are generated by discharging a capacitor into a pulse responsive or pulse utilizing circuit and in which a transistor is utilized to control the supply of charging current to the capacitor, and a further object of the invention is the provision in a pulse generating circuit of this character of means for enabling the transistor to be operated at its maximum collector current capability.

Still another object is the provision in such a pulse generating circuit of means for compelling the transistor to operate as a switch, i.e., to operate fully turned off or saturated and fully turned on thereby to minimize power dissipation in the transistor.

In many electrical systems the delay or transport time between an input control signal and the corresponding charge in output leads to system instability. The time required to charge a capacitor which is to be discharged to produce a controlling pulse represents a transport time, and accordingly a further object of this invention is the provision in a pulse generating circuit of means for operating the transistor at maximum current capability thereby to charge the capacitor in the minimum time consistent with the maximum safe current carrying capability of the transistor thereby to minimize transport time.

In carrying the invention into effect in one form thereof, a solid state electric valve such as a transistor having main current carrying electrodes and a control electrode is provided with control circuitry interconnecting one of its main electrodes and its control circuit electrode. The control circuit comprises two parallel branches and means are provided for supplying dephased alternating voltages in these branches together with additional means for supplying a direct voltage to one of them. A diode is connected between the junction point of the branches and the control electrode of the transistor and a second diode is connected in one of the branches. These diodes coact with the dephased voltages to supply current pulses to the control electrode which in turn cause amplified current pulses to be supplied to a capacitor in the circuit of the main current conducting electrodes. The transistor is caused to operate at maximum collector current capacity and its power dissipation is minimized by including in the control circuit and in the main power circuit of the transistor, nonlinear current limiting devices which have the property of presenting relatively low impedance to currents smaller than a predetermined limiting value and relatively high impedance to currents that tend to exceed such predetermined value.

For a better and more complete understanding of the invention reference should now be had to the following specification and to the accompanying drawings in which.

Figure 1:
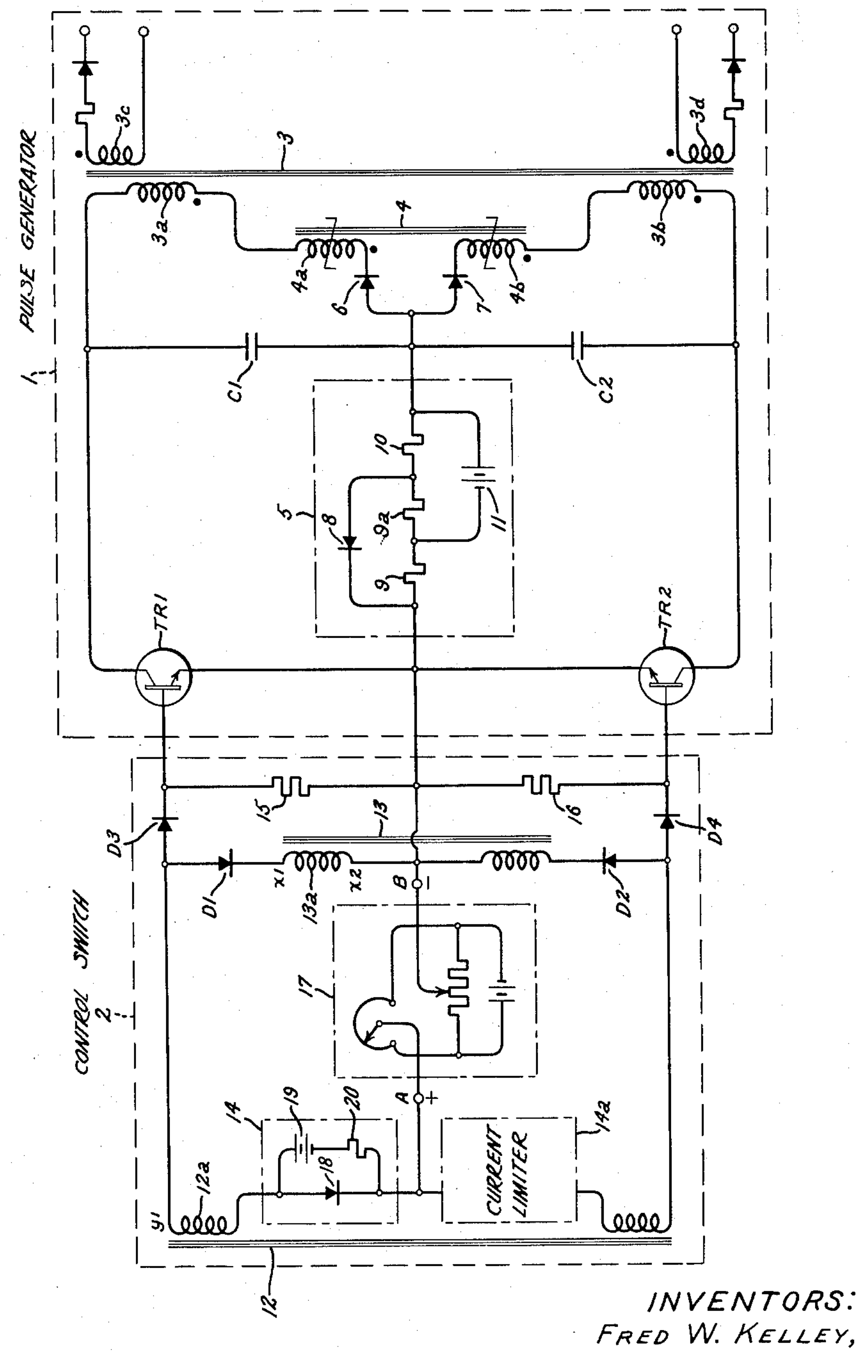
FIG. 1 is a simple schematic diagram of an embodiment of the invention.

Referring now to the drawing and particularly to FIG. 1 thereof, for description purposes, the pulse generating means may be considered as comprising two main sections, i.e., a pulse generating circuit 1 and a plural dephased alternating voltage control circuit 2. The pulse generating circuit is illustrated as comprising capacitors C1 and C2, output transformer 3, holdoff reactance device 4, combined power supply and current limiter circuit 5, transistors TR1 and TR2 and diode rectifiers 6 and 7.

The output transformer 3 is provided with biphase primary windings 3*a* and 3*b* and a plurality of associated secondary windings 3*c* and 3*d*. Each of these secondary windings has terminals for connection to a pulse utilizing or pulse controlled device. For example, the terminals of each of the secondary windings may be connected to supply firing current pulses to a gate control circuit of a solid state electric valve such for example as a silicon controlled rectifier.

For the purpose of producing pulses in alternation, the pulse generator section 1 has two symmetrical sections which are connected in push-pull configuration. One of these sections comprises the diode rectifier 6, reactance winding 4*a* of saturable core reactor 4, primary winding 3*a* and its associated secondary windings 3*c* and 3*d*, transistor TR1 and capacitor C1. The other section of the push-pull configuration comprises diode 7, reactance winding 4*b*, primary winding 3*b* and associated secondary windings 3*e* and 3*f*, transistor TR2 and capacitor C2. Since both sections of the pulse generator circuit are symmetrical and operate in alternation, the power supply and current limiter 5 supplies both sections. This power supply and current limiter may be of any suitable type. For example, it may comprise the diode rectifier 8, resistors 9, 9*a* and 10 and D.-C. source 11 connected in the configuration illustrated in the drawing. Although D.-C. source 11 is illustrated as a battery it may be a full wave rectifier with filtered output.

The plural dephased alternating voltage control circuit comprises transformers 12 and 13, diodes D1, D2, D3, and D4, current limiting devices 14 and 14*a*, resistors 15 and 16 and a source 17 of adjustable, reversible polarity direct voltage having terminals A and B. This control circuit may be considered as comprising two symmetrical sections each for controlling the conduction of a different one of the transistors TR1 and TR2. The control circuit for transistor TR1 extends externally of the transistor from the emitter of the transistor to the base and comprises a combination of two branches and the diode D3 connected in series relationship therewith. One of these branches comprises the source 17 of adjustable direct voltage, current limiting device 14 and secondary winding 12*a* of transformer 12. The other branch comprises transformer secondary winding 13*a* of transformer 13 and diode D1 connected in series relationship between the junction point of the two branch circuits and the secondary winding 13*a*.

Figure 2:
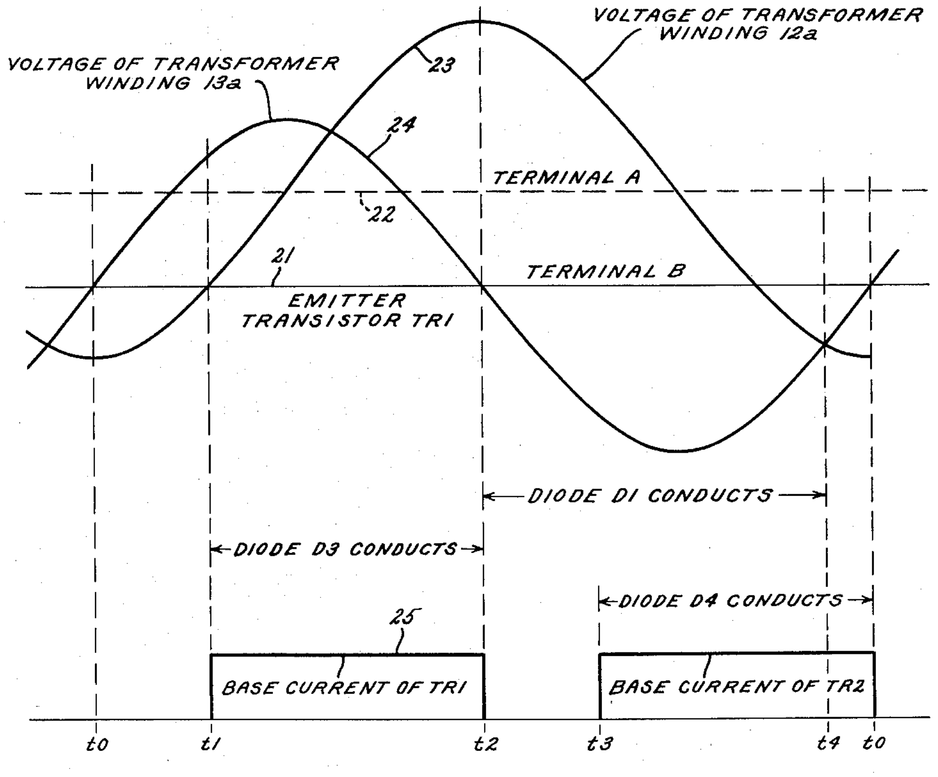
FIG. 2 is a chart of characteristic curves which facilitate an understanding of the invention and its mode of operation.

Although the current limiting devices 14 and 14*a* may be of any suitable type, preferably they are nonlinear resistance devices which have the property of presenting a trivial impedance to currents up to a predetermined current limiting value and a relatively much higher impedance to currents that tend to exceed the limiting value. As shown, current limiting device 14 comprises a diode rectifier 18 and a branch circuit in parallel therewith comprising the series combination of a D.-C. source 19 and a resistor 20. Preferably, current limiting device 14*a* is similar to current limiting device 14 and for this reason device 14*a* is illustrated conventionally. The primary windings (not shown) of transformers 12 and 13 are supplied from suitable A.-C. sources whose voltages are dephased; e.g., they may be in quadrature. Sinusoidal quadrature voltages are induced in the secondary windings and are supplied to the control circuit. A direct voltage is supplied to terminals A and B. It is assumed, in the following description, that the voltage at terminal A is positive with respect to the voltage at terminal B. This is illustrated in FIG. 2 in which the emitter voltage of transistor TR1 is assumed to be the reference voltage point and is represented by the zero axis horizontal line 21. Since terminal B is connected to the emitter of transistor TR1, line 21 also represents the voltage of terminal B as well as the voltage at the terminal *x*2 which is connected to the terminal B and to the emitter. Since the direct voltage at terminal A is assumed to be positive with respect to the voltage a terminal B, it is represented by the horizontal line 22 located above line 21. The alternating voltage supplied by the secondary winding 12*a* of transformer 12 is represented by the sinusoidal curve 23 and that supplied by the secondary winding 13*a* of transformer 13 is represented by sinusoidal curve 24.

In FIG. 2 the conducting periods of diodes D1, D3 and D4 are designated by arrows with appropriate legends. Each of these rectifiers is blocking for that part of the cycle in which it is not conducting. During the time interval *t*2 to *t*4 diode D1 conducts because the voltage at terminal *x*1 is negative with respect to the voltage at terminal B. Diode D3 starts to conduct when the voltage at terminal *y*1 (curve 23) of transformer 12*a* is positive with respect to terminal B and its stops conducting when the voltage at terminal *x*1 of transformer winding 13*a* becomes negative with respect to the voltage at terminal B. Thus, diode D3 conducts during the time interval *t*1 to *t*2 and blocks for the remainder of the cycle, i.e, period *t*2 to *t*1; consequently a turn on signal cannot be applied to the base electrode of transistor TR1 during this period. Similarly, owing to the symmetry of the two halves of the circuit, the diode D4 blocks during the period *t*0 to *t*3 and a turn on signal cannot be supplied to the base of transistor TR2 during this period. The transistor TR1 conducts whenever diode D3 is conducting, i.e., it conducts during the time interval *t*1 to *t*2. Similarly the transistor TR2 conducts whenever diode D4 conducts; consequently it conducts during the period *t*3 to *t*0.

Since the forward impedances of diode D3 and transistor TR1 are relatively low, the base current of transistor TR1 will build up rapidly to the current limited value determined by the current limiting device 14. The current limited value is indicated by the horizontal portion of curve 25.

Figure 3:
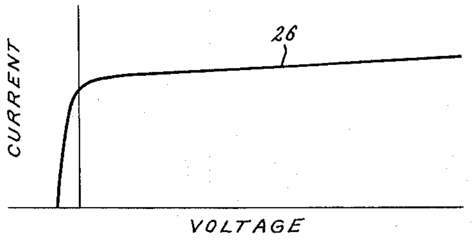
FIG. 3 is a characteristic curve illustrating the current limiting characteristic of one of the current limiting devices of FIG. 1.
Figure 4:
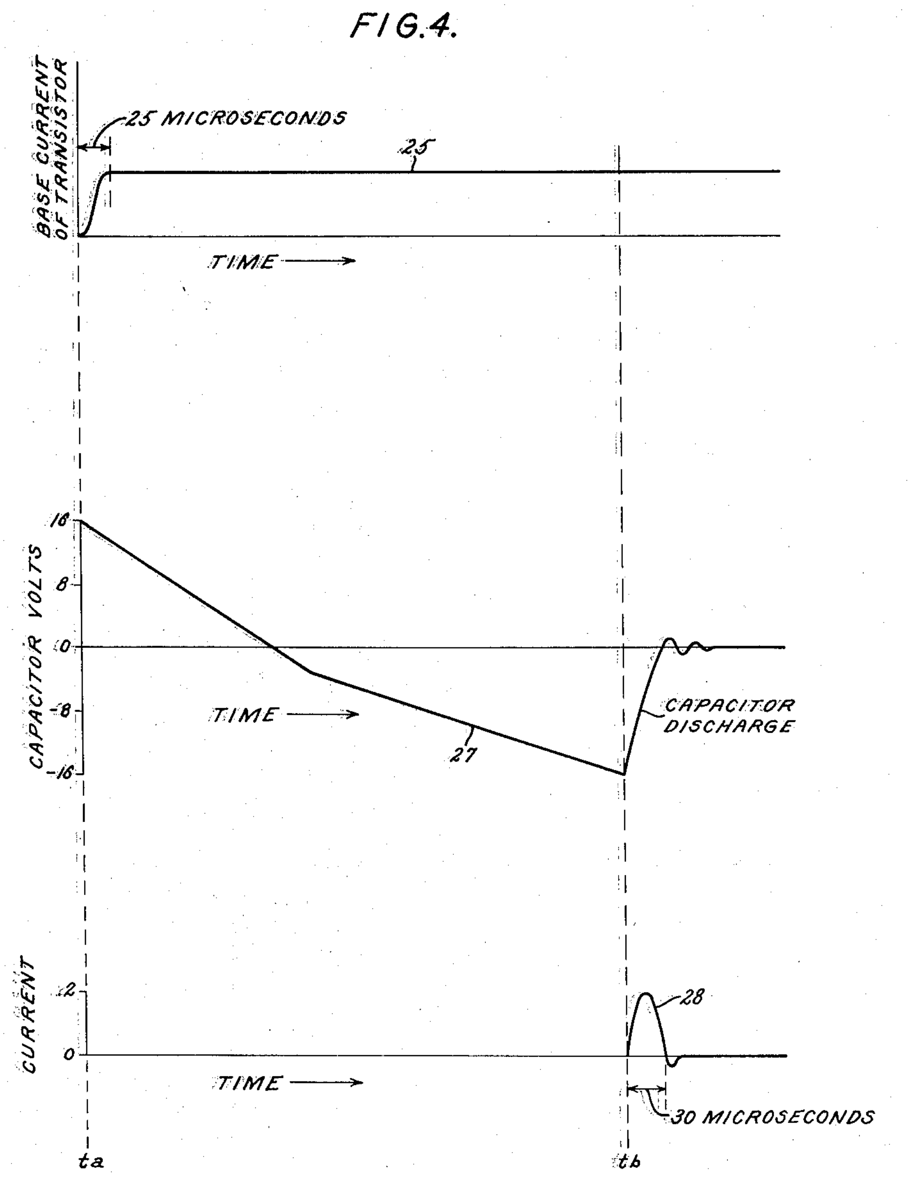
FIG. 4 is a chart of characteristic curves that serve to facilitate an understanding of the operation of the pulse generating circuit.

In describing the operation of pulse generation, it is assumed that the primary windings 3*a* and 3*b* of transformer 3 and the reactance windings 4*a* and 4*b* of saturable reactor 4 are poled and connected so that a voltage can be developed across the transformer primary winding and the saturable reactance winding connected in series therewith when the dotted terminal is made positive with respect to the other terminal. At time *t*1, the diode D1 is blocking and diode D3 becomes conducting. Since the forward impedances of diode D3 and transistor TR1 are relatively low, the base current of the transistor will build up rapidly to the current limited value that is determined by the current limit device 14. This rapid buildup of the base current is represented in FIG. 2 by the abrupt vertical portion of curve 25 and the assumed current limited value is represented by the horizontal portion of curve 25. A portion of the curve 25 is illustrated on an enlarged time scale in FIG. 4. For a typically representative case, the current limited value may be assumed to be 5 milliamperes and the rise time may be assumed to be 25 microseconds. This extremely short rise time or steep wave front of the current pulse supplied to the base circuit of the transistor TR1 is important. The voltages and circuit impedances required to produce the desired steepness of the wave front are capable of producing current values that would destroy the transistor. However, the nonlinear current limiting devices 14 and 14*a*, although presenting trivial impedance to currents less than the limiting value, present a very high impedance to currents that tend to exceed the limiting value. This nonlinear impedance property is graphically illustrated in FIG. 3 by its volt ampere characteristic curve 26 of which ordinates represent current through the terminals of the device and abscissae represent the voltage across the terminals. This property makes it possible to obtain the desired steepness of wave front and at the same time to operate the transistor at its maximum safe current rating without danger of exceeding it.

In response to the application of the steep current front to the base and emitter of transistor TR1 conduction takes places from the collector to the emitter thereby causing the current limited D.-C. power supply 5 to charge the capacitor C1 while the reactance winding 4*a* of saturable reactor 4 absorbs and thus stands off the voltage of the capacitor C1. Owing to the current limiting action of the current limited power supply 5 and the current limiting action of the current limit device 14 the transistor TR1 will be saturated. In consequence, the capacitor C1 is charged at constant current at the current limited value of the power supply and the voltage of the capacitor rises linearly as graphically represented by the initial straight line portion of curve 27 in FIG. 4 in which ordinates represent the capacitor volts with respect to the transistor collector terminal. At time *tb* the volt-seconds applied across saturable reactor winding 4*a* during the time interval *ta* to *tb* are sufficient to drive the reactor into saturation. This causes the impedance of the reactor to decrease abruptly to such a low value that the capacitor voltage suddenly appears across the transformer winding 3*a*. The capacitor then discharges as represented graphically by the abruptly rising portion of curve 27 immediately following time *tb*. As a result of the discharge of the capacitor a pulse of current is generated in the capacitor discharge circuit through the reactance winding 4*a* and the primary winding 3*a* which is graphically represented in FIG. 4 by the pulse shaped curve 28. Typically this current pulse might have an amplitude of .2 ampere and a duration of 30 microseconds. This pulse causes a corresponding pulse to be induced in secondary winding 3*c* which is supplied to the pulse utilizing or pulse controlled device connected thereto. As previously mentioned, these pulses may be supplied as firing pulses to the gate and cathode circuits of solid state silicon controlled rectifiers to cause them to change from the nonconducting to the conducting state.

After the capacitor C1 discharges and the pulse has terminated, collector current continues to be present in the reactance winding 4*a* and transformer winding 3*a* as long as the base current maintains transistor TR1 conductive, i.e., until time *t*2 (FIG. 2) when the transistor is turned off. At time *t*3 transistor TR2 is turned on, and the above operation is repeated, this time with diodes D2 and D4, capacitor C2, transformer primary winding 3*b* and reactor winding 4*b*. During the interval of charging of the capacitor C2 the voltage applied across saturable reactor winding 4*b* is of such polarity and the volt-seconds are of such magnitude as to cause eventual negative saturation of the saturable reactor 4.

The phase relationship between each pair of pulses and a set phase reference on a 60 cycle supply can be made to vary by more than 150 electrical degrees by adjustment of the D.-C. control signal voltage between terminal A and terminal B from a maximum positive to a maximum negative value.

By adjusting the magnitude of the direct voltage between terminals A and B the application to the transistor TR1 of the steep current front represented by the abrupt rise of curve 25 can be made to vary through the time interval *t*0 to *t*2. When the current front occurs at *t*0, the output pulse phase is described as "full advance." From this point, by decreasing the direct voltage from the value equal to the peak of the signal voltage of transformer 12 (represented by curve 23) the phase position of the output pulse can be retarded. When the direct voltage is zero the pulse will be 90 degrees retarded and if its polarity is reversed and increased to peak amplitude of the signal voltage, a theoretical retard angle of 180 degrees is obtained. In practice, as the pulse is retarded beyond 90 degrees the rise time of the current front increases and as the 180 degree retard point is approached, the rise time increases sufficiently to reduce the output pulses to extinction.

If the D.-C. voltage is increased beyond full advance, no current front would be generated if the voltage produced by transformer 13 were not present. Conduction of the transistor base current would be uninterrupted. The presence of this voltage (curve 24) causes transistor TR1 base current to be zero prior to time *t*0 thus assuring a current front at *t*0 even if the direct current exceeds the peak of the signal voltage (curve 23). The same reasoning applies to transistor TR2.

Although a specific form of the invention has been illustrated and described it will be understood that the invention is not limited thereto since alterations and modifications will readily suggest themselves to persons skilled in the art without parting from the true spirit of the invention or from the scope of the annexed claims.

What we claim as new and desire to secure by Letters Patent of the United States is:

1. In combination, a semiconductor type electric valve having main current electrodes and a control electrode, a control circuit interconnecting said control electrode and one of said main electrodes and comprising two parallel branches, means for supplying dephased alternating voltages to said branches, means for supplying a direct voltage in one of said branches, a diode rectifier connected in one of said branches, and a second diode rectifier connected between said branches and said control electrode.

2. In combination, a semiconductor type electric valve having main current conducting electrodes and a control electrode, a control circuit interconnecting said control electrode and one of said main electrodes and comprising two parallel branches, means for supplying dephased alternating voltages to said branches, means for supplying a direct voltage in one of said branches, a diode rectifier connected between one of the junction points of said branches and said control electrode and a second diode rectifier connected in one of said branches and having one of its electrodes connected to said junction point.

3. In combination a solid state electric valve having main current electrodes and a control current electrode, a control circuit interconnecting said control electrode and one of said main electrodes and comprising two parallel branches, means for supplying a direct voltage in one of said branches, means for supplying dephased alternating voltages to said branches, a diode rectifier connected in one of said branches and having one of its electrodes connected to one of the junction points of said branches, and a second diode rectifier connected between said branches and said control electrode and having one of its electrodes connected to said one junction point.

4. In combination a solid state electric valve having main current conducting electrodes, and a control current electrode, a control circuit interconnecting said control electrode and one of said main electrodes and comprising two parallel branches, means for supplying dephased alternating voltages to said branches, means for supplying a direct voltage to one of said branches, a current limiting device connected in one of said branches, a diode rectifier included in said control circuit between a junction point of said branches and said control electrode and a second diode rectifier connected in one of said branches and having one of its electrodes connected to said junction point.

5. In combination, a solid state electric valve having main current conducting electric electrodes and a control current electrode, a control circuit interconnecting said control electrode and one of said main electrodes and comprising a combination of two parallel branches, means for supplying dephased alternating voltages to said branches, means for supplying a direct voltage to one of said branches, means for limiting the current in one of said branches comprising a nonlinear resistance device presenting relatively low resistance to currents of less than a predetermined value and relatively high resistance to currents that tend to exceed said value, a diode rectifier included in said control circuit between a junction point of said branches and said control electrode and a second diode rectifier connected in one of said branches and having one of its electrodes connected to said junction point.

6. In combination, a capacitor, a charging circuit for said capacitor, a current limiting device included in said charging circuit, a solid state electric valve having main current conducting electrodes included in said charging circuit and a control electrode, a control circuit interconnecting one of said main electrodes and said control electrode including a combination of two parallel branches, means for supplying dephased alternating voltages to said branches, means for supplying a direct voltage in a first of said branches, means for limiting the current in said first branch to a predetermined value comprising a nonlinear resistance device presenting relatively low impedance to currents less than said predetermined value and relatively high impedance to currents tending to exceed said predetermined value, a source of direct voltage included in said charging circuit, and a discharge circuit for said capacitor comprising a translating device and a saturable core reactance device connected in series relationship across said capacitor.

7. In combination, a capacitor, a charging circuit for said capacitor, a source of direct current and a current limiting device included in said charging circuit, a solid state electric valve having main current conducting electrodes included in said charging circuit and a control electrode, a control circuit interconnecting one of said main electrodes and said control electrode including a combination of two parallel connected branches, means for supplying dephased alternating voltages to said branches, means for supplying a direct voltage to a first of said branches, means for limiting the current in said first branch to a predetermined value comprising a nonlinear resistance device presenting relatively low impedance to currents less than said predetermined value and relatively high impedance to currents tending to exceed said predetermined value, a diode connected between a junction point of said branches and said control electrode, a second diode connected in the second of said branches and having one of its electrodes connected to said junction point, and a discharge circuit for said capacitor comprising a relatively low impedance device and a saturable core reactance device connected in circuit therewith and having relatively high impedance in its unsaturated state.

References Cited in the file of this patent

UNITED STATES PATENTS

| | | |
|---|---|---|
| 2,809,303 | Collins | Oct. 8, 1957 |
| 2,817,733 | McKenney | Dec. 24, 1957 |